United States Patent
Enriquez Ortiz (10) Patent No.: US 9,789,762 B2
(45) Date of Patent: Oct. 17, 2017

(54) SYSTEM AND METHOD FOR AUTOMATICALLY ADJUSTING AN ANGLE OF A THREE-DIMENSIONAL DISPLAY WITHIN A VEHICLE

(71) Applicant: Visteon Global Technologies, Inc., Van Buren Township, MI (US)

(72) Inventor: Mario Javier Enriquez Ortiz, Holland, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/651,990

(22) PCT Filed: Dec. 4, 2013

(86) PCT No.: PCT/US2013/073137
§ 371 (c)(1),
(2) Date: Jun. 12, 2015

(87) PCT Pub. No.: WO2014/093100
PCT Pub. Date: Jun. 19, 2014

(65) Prior Publication Data
US 2015/0314682 A1  Nov. 5, 2015

Related U.S. Application Data

(60) Provisional application No. 61/737,252, filed on Dec. 14, 2012.

(51) Int. Cl.
*B60R 22/00* (2006.01)
*E05F 15/00* (2015.01)
(Continued)

(52) U.S. Cl.
CPC .......... *B60K 35/00* (2013.01); *G02B 27/0093* (2013.01); *G02B 27/2214* (2013.01);
(Continued)

(58) Field of Classification Search
CPC .......... H04N 21/44218; H04N 13/021; H04N 13/026; H04N 13/007; H04N 13/04;
(Continued)

(56) References Cited

U.S. PATENT DOCUMENTS 6,795,241 B1 *  9/2004  Holzbach ............... G02B 3/005
                                                                348/51
7,619,815 B2 *  11/2009  Nam .................. G02B 27/2214
                                                                348/51
(Continued)

FOREIGN PATENT DOCUMENTS

DE       19737449       2/1999
DE       102005001973   7/2006
(Continued)

OTHER PUBLICATIONS

PCT International Search Report and Written Opinion mailed May 30, 2014.
(Continued)

*Primary Examiner* — Jelani Smith
*Assistant Examiner* — Luis A Martinez Borrero
(74) *Attorney, Agent, or Firm* — Fletcher Yoder, P.C.

(57) ABSTRACT

A vehicle display assembly includes a three-dimensional (3D) display, and an actuator coupled to the 3D display. The actuator is configured to adjust an orientation of the 3D display relative to a vehicle occupant. The vehicle display assembly also includes a sensor assembly configured to monitor a position of a head of the vehicle occupant, and a controller communicatively coupled to the sensor assembly and to the actuator. The controller is configured to instruct the actuator to adjust the orientation of the 3D display based on the position of the head of the vehicle occupant.

18 Claims, 5 Drawing Sheets

(51) Int. Cl.
| | |
|---|---|
| G05D 1/00 | (2006.01) |
| G05D 3/00 | (2006.01) |
| G06F 7/00 | (2006.01) |
| G06F 17/00 | (2006.01) |
| B60K 35/00 | (2006.01) |
| G02B 27/22 | (2006.01) |
| H04N 13/04 | (2006.01) |
| G02B 27/00 | (2006.01) |

(52) U.S. Cl.
CPC ..... *H04N 13/0409* (2013.01); *H04N 13/0468* (2013.01); *H04N 13/0497* (2013.01); *B60K 2350/206* (2013.01); *B60K 2350/2013* (2013.01); *B60K 2350/2017* (2013.01); *B60K 2350/901* (2013.01); *B60K 2350/903* (2013.01)

(58) Field of Classification Search
CPC ......... H04N 21/42653; H04N 21/4316; H04N 21/440218; G02B 2027/0118; G02B 21/06; G02B 27/02; G02B 27/26; G02B 27/17; G02B 2027/0132; G02B 2027/0159; G02B 2027/0183; G02B 2027/0198; B60K 2350/1072; B60K 2350/2013; B60K 2350/903; B60K 2350/2017; B60K 2350/1028; B60K 2350/2052; B60K 2350/352; B60K 2350/1004
USPC ........ 701/41, 49, 3, 23, 120, 36, 42; 348/48, 348/49, 53, 56, 60
See application file for complete search history.

(56) References Cited

U.S. PATENT DOCUMENTS

| | | | | |
|---|---|---|---|---|
| 8,154,799 B2* | 4/2012 | Kim | .................. | G02B 27/2214 348/59 |
| 8,866,892 B2* | 10/2014 | Kim | .................. | H04N 13/0438 348/55 |
| 9,030,534 B2* | 5/2015 | Cha | .................. | H04N 13/0404 348/51 |
| 9,291,829 B2* | 3/2016 | Prouty, IV | ......... | G02B 27/2214 |
| 9,317,106 B2* | 4/2016 | Su | .................. | G06F 3/005 |
| 9,414,049 B2* | 8/2016 | Gaudreau | .......... | G02B 27/2214 |
| 9,462,261 B2* | 10/2016 | Sung | .................. | G02B 27/2214 |
| 2001/0038360 A1* | 11/2001 | Fukushima | .......... | G02B 27/017 345/8 |
| 2001/0050813 A1* | 12/2001 | Allio | .................. | G02B 27/2214 359/462 |
| 2004/0062424 A1* | 4/2004 | Mariani | ............. | G06K 9/00228 382/118 |
| 2006/0039529 A1* | 2/2006 | Tsubaki | .................... | A61B 6/02 378/41 |
| 2006/0119572 A1* | 6/2006 | Lanier | .................... | G06F 1/1601 345/156 |
| 2008/0197996 A1 | 8/2008 | Kumon | | |
| 2009/0123030 A1* | 5/2009 | De La Barre | ....... | H04N 13/0409 382/103 |
| 2010/0073636 A1* | 3/2010 | Sasaki | ................ | G02B 27/0093 353/13 |
| 2012/0033297 A1 | 2/2012 | Hsiao | | |
| 2012/0056876 A1* | 3/2012 | Lee | .................... | H04N 13/0434 345/419 |
| 2012/0105954 A1* | 5/2012 | Prouty, IV | ......... | G02B 27/2214 359/462 |
| 2012/0235901 A1* | 9/2012 | Binder | .................. | G01S 3/7864 345/156 |
| 2012/0313839 A1* | 12/2012 | Smithwick | ......... | G02B 27/2214 345/6 |
| 2013/0201303 A1* | 8/2013 | Shimotani | ............ | G01C 21/365 348/51 |
| 2013/0235169 A1* | 9/2013 | Kato | ...................... | G02B 27/01 348/53 |
| 2014/0320614 A1* | 10/2014 | Gaudreau | .......... | G02B 27/2214 348/51 |

FOREIGN PATENT DOCUMENTS

| | | | | |
|---|---|---|---|---|
| IL | WO 2010134066 A1 * | 11/2010 | .......... | G01S 3/7864 |
| JP | S5445071 A | 4/1979 | | |
| JP | H09168170 A | 6/1997 | | |
| JP | 2003252127 A | 9/2003 | | |
| JP | 2006324952 A | 11/2006 | | |
| JP | 2008067312 A | 3/2008 | | |
| JP | 2008141578 A | 6/2008 | | |
| JP | 2009271095 A | 11/2009 | | |
| JP | 2010054350 A | 3/2010 | | |

OTHER PUBLICATIONS

JP Application No. 2015-547413 Office Action Mailed Aug. 23, 2016; 3 Pages.

* cited by examiner

SYSTEM AND METHOD FOR AUTOMATICALLY ADJUSTING AN ANGLE OF A THREE-DIMENSIONAL DISPLAY WITHIN A VEHICLE

CROSS REFERENCE TO RELATED APPLICATION

This application is a national stage of PCT Application No. PCT/US2013/73137, entitled "SYSTEM AND METHOD FOR AUTOMATICALLY ADJUSTING AN ANGLE OF A THREE-DIMENSIONAL DISPLAY WITHIN A VEHICLE", filed on Dec. 4, 2013, which claims priority from and the benefit of U.S. Provisional Patent Application Ser. No. 61/737,252, entitled "SYSTEM AND METHOD FOR AUTOMATICALLY ADJUSTING AN ANGLE OF A THREE-DIMENSIONAL DISPLAY WITHIN A VEHICLE", filed Dec. 14, 2012. Each of the foregoing applications is hereby incorporated by reference in its entirety.

BACKGROUND

The invention relates generally to a system and method for automatically adjusting an angle of a three-dimensional display within a vehicle.

Certain vehicles include a variety of displays configured to convey information to a driver. For example, an instrument panel may include gauges and/or displays configured to present information related to vehicle speed, fuel quantity, fuel efficiency, oil temperature, oil pressure, coolant temperature and engine speed, among other parameters. Certain instrument panels also include graphical representations of the displayed information. For example, the instrument panel may include a display configured to present a graph of fuel efficiency as a function of time. In addition, the vehicle may include another display within a center console configured to present further graphical information to the driver. For example, the center console display may present information related to navigation, environmental controls, and audio functions, among other information.

Certain vehicles may employ one or more three-dimensional (3D) displays to facilitate efficient presentation of information to the driver. The 3D displays may be autostereoscopic, thereby enabling the driver to view a 3D image on the display without the use of 3D glasses (e.g., polarized glasses, LCD shutter glasses, etc.). For example, the autostereoscopic 3D display may include multiple pixels configured to form an image on a display surface, and a parallax barrier positioned adjacent to the display surface to separate the image into a left-eye portion and a right-eye portion. To view the image in three dimensions, the autostereoscopic 3D display is positioned substantially perpendicular to a line-of-sight of the viewer. Unfortunately, due to variations in the lateral seating position of the driver and/or driver movement (e.g., in the lateral direction) in response to vehicle dynamics, the display may not be oriented substantially perpendicular to the line-of-sight of the driver while the head of the driver is directed toward the display. Consequently, the driver may not be able to view the image in three-dimensions.

BRIEF DESCRIPTION OF THE INVENTION

The present invention relates to a vehicle display assembly including a three-dimensional (3D) display, and an actuator coupled to the 3D display. The actuator is configured to adjust an orientation of the 3D display relative to a vehicle occupant. The vehicle display assembly also includes a sensor assembly configured to monitor a position of a head of the vehicle occupant, and a controller communicatively coupled to the sensor assembly and to the actuator. The controller is configured to instruct the actuator to adjust the orientation of the 3D display based on the position of the head of the vehicle occupant.

The present invention also relates to a vehicle display assembly including a three-dimensional (3D) display, and an actuator coupled to the 3D display. The actuator is configured to adjust an orientation of the 3D display relative to a first vehicle occupant and a second vehicle occupant. The vehicle display assembly also includes a sensor assembly configured to monitor a first position of a first head of the first vehicle occupant, and a second position of a second head of the second vehicle occupant. The vehicle display assembly further includes a controller communicatively coupled to the sensor assembly and to the actuator. The controller is configured to instruct the actuator to adjust the orientation of the 3D display based on the first position of the first head and/or the second position of the second head.

The present invention further relates to a method of operating a vehicle display assembly including receiving a first signal from a sensor assembly indicative of a position of a head of a vehicle occupant. The method also includes determining a desired orientation of a three-dimensional (3D) display based on the first signal. The desired orientation directs the 3D display toward the head of the vehicle occupant. The method further includes sending a second signal to an actuator coupled to the 3D display indicative of the desired orientation.

DETAILED DESCRIPTION

Figure 1:
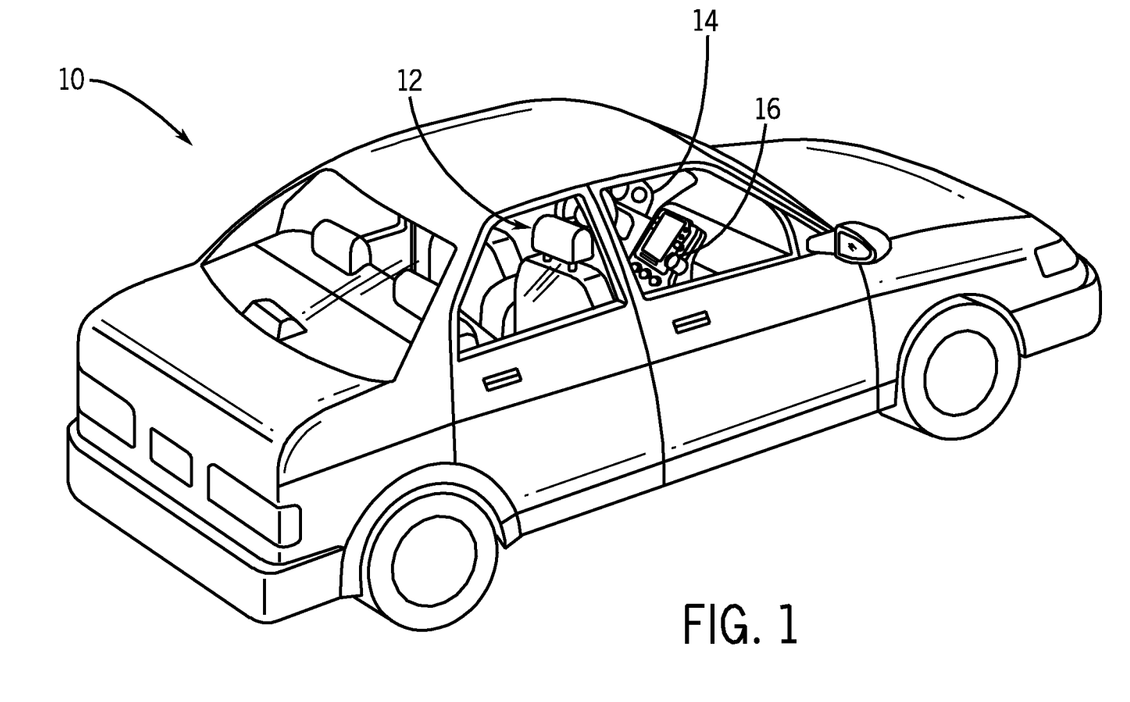
FIG. 1 is a perspective view of an exemplary vehicle that may include a vehicle display assembly configured to automatically adjust an orientation of a three-dimensional display based on driver head position.

FIG. 1 is a perspective view of an exemplary vehicle 10 that may include a display assembly configured to automatically adjust an orientation of a three-dimensional (3D) display based on driver head position. As illustrated, the vehicle 10 includes an interior 12 having an instrument panel 14 and a center console 16. As discussed in detail below, a display assembly within the instrument panel 14 and/or the center console 16 may present 3D images to the driver and/or the front passenger. For example, in certain embodiments, the display assembly includes a 3D display, and an actuator coupled to the 3D display. The actuator is configured to adjust an orientation of the 3D display relative to a vehicle occupant (e.g., the driver, the front passenger, etc.). The display assembly also includes a sensor assembly configured to monitor a position of a head of the vehicle occupant. A controller, which is communicatively coupled to the sensor assembly and to the actuator, is configured to instruct the actuator to adjust the orientation of the 3D display based on the position of the head of the vehicle occupant. For example, the controller may be configured to direct the 3D display toward the head of the vehicle occupant. Accordingly, the 3D display may be oriented substantially perpendicular to a line-of-sight of the vehicle occupant while the head of the vehicle occupant is directed toward the 3D display. As a result, vehicle occupants may be able to view an image on the display in three dimensions despite variations in lateral seating position and/or movement (e.g., in the lateral direction) in response to vehicle dynamics.

As used herein, the term "three-dimensional" or "3D" refers to an image that appears to have three dimensions, as compared to a two-dimensional perspective view of a 3D object. Such images may be known as stereoscopic images. The term "3D display" references to a display device capable of producing a 3D image. As discussed in detail below, the present embodiments may employ autostereoscopic displays that enable a vehicle occupant to view a 3D image on the display without the use of 3D glasses (e.g., polarized glasses, LCD shutter glasses, etc.). For example, the autostereoscopic 3D display may include multiple pixels configured to form an image on a display surface, and a parallax barrier positioned adjacent to the display surface to separate the image into a left-eye portion and a right-eye portion. To view the image in three dimensions, the autostereoscopic 3D display is positioned substantially perpendicular to a line-of-sight of the vehicle occupant. Consequently, a right eye of the vehicle occupant views the right-eye portion of the image, and a left eye of the vehicle occupant views the left-eye portion of the image. Because each eye sees a different image, the 3D display appears to produce a 3D image.

Figure 2:
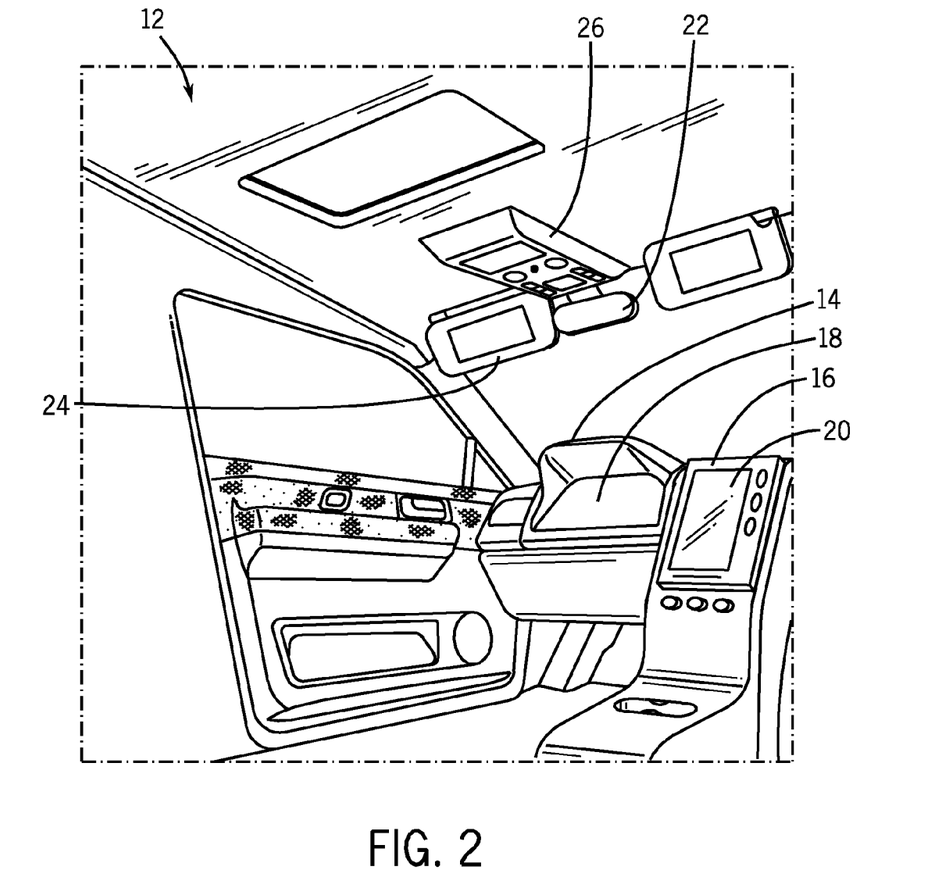
FIG. 2 is a perspective view of a part of the interior of the vehicle of FIG. 1.

FIG. 2 is a perspective view of a part of the interior 12 of the vehicle 10 of FIG. 1. As illustrated, the instrument panel 14 includes a first graphical display 18, and the center console 16 includes a second graphical display 20. As discussed in detail below, the first graphical display 18 and/or the second graphical display 20 may be configured to present 3D images to a vehicle occupant. As will be appreciated, variations in lateral seating position and/or vehicle dynamics may place a head of the occupant in various positions within the vehicle interior 12. Accordingly, the vehicle display assembly is configured to monitor the position of the occupant head, and to adjust an orientation of the display (e.g., the first display 18 and/or the second display 20) based on the occupant head position. For example, the vehicle display assembly may be configured to direct the display toward the head of the vehicle occupant, thereby substantially orienting the display perpendicular to a line-of-sight of the occupant while the occupant head is directed toward the display. As a result, the vehicle occupant may be able to view an image on the display in three dimensions. While the illustrated interior 12 includes graphical displays within the instrument panel 14 and the center console 16, it should be appreciated that alternative embodiments may include graphical displays located within other components of the vehicle interior. For example, in certain embodiments, a graphical display may be disposed within a rearview mirror 22, a sun visor 24, an overhead console 26, and/or any other visible surface within the interior 12 of the vehicle 10. In such embodiments, an orientation of the graphical displays may be adjusted based on occupant head position to enable the occupant to view images on the displays in three dimensions.

Figure 3:
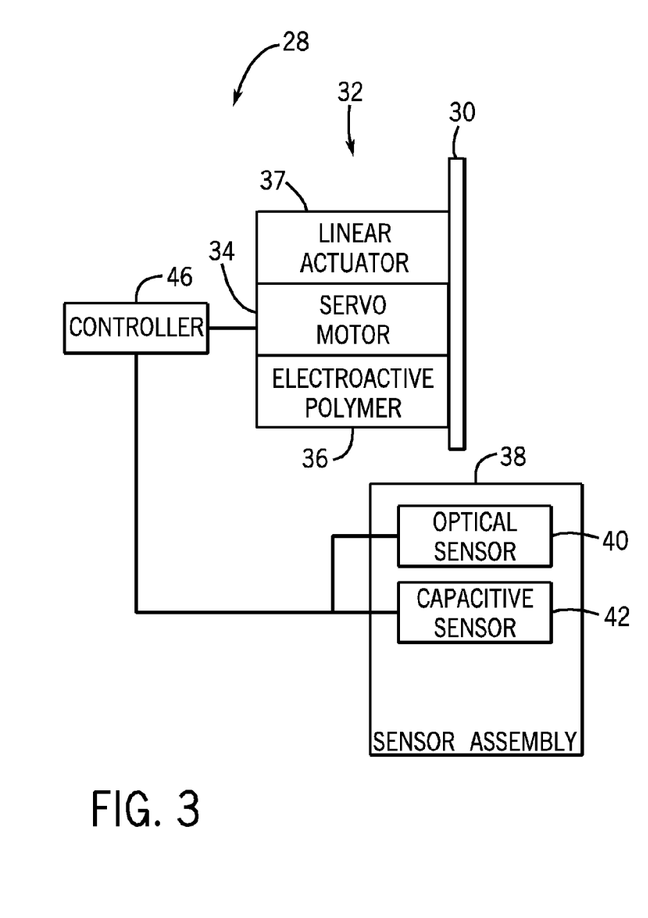
FIG. 3 is a schematic diagram of an embodiment of a vehicle display assembly that may be employed within the vehicle of FIG. 1.

FIG. 3 is a schematic diagram of an embodiment of a vehicle display assembly 28 that may be employed within the vehicle 10 of FIG. 1. As illustrated, the vehicle display assembly 28 includes a 3D display 30 configured to present a 3D image to a vehicle occupant (e.g., a driver or a passenger within the vehicle 10). The vehicle display assembly 28 also includes an actuator 32 coupled to the 3D display 30 and configured to adjust an orientation of the 3D display relative to the vehicle occupant. In certain embodiments, the actuator 32 includes one or more electrical servo motors 34 configured to rotate the display 30 about one or more axes. For example, a first servo motor 34 may be configured to rotate the display about a vertical axis, and a second servo motor 34 may be configured to rotate the display about a horizontal axis. In such a configuration, the 3D display 30 may be directed toward various regions of the vehicle interior 12. In addition, the actuator 32 may include one or more electroactive polymers 36 to adjust the orientation of the 3D display 30. As will be appreciated, electroactive polymers 36 are configured to change shape in response to application of electrical current. Similar to the servo motors 34, the electroactive polymers 36 may be configured to facilitate rotation of the 3D display 30 about multiple axes. Furthermore, the actuator 32 may include one or more linear actuators 37 to adjust the orientation of the 3D display 30. For example, the 3D display may be coupled to a pivot, and the linear actuator 37 may be configured to rotate the display about the pivot (e.g., about one or more axes). The actuator 32 may include only servo motors 34, only electroactive polymers 36, only linear actuators 37, a combination of servo motors, electroactive polymers, and linear actuators, or any other device suitable for rotating the 3D display about one or more axes.

In the illustrated embodiment, the vehicle display assembly 28 also includes a sensor assembly 38 configured to monitor a position of a head of the vehicle occupant within the vehicle interior 12. The sensor assembly 38 may include an optical sensor 40 (e.g., camera) configured to monitor the position of the occupant head based on an image, or series of images, of the vehicle interior 12. For example, the optical sensor 40 may analyze an image, or series of images, of the vehicle interior 12 to identify an occupant head, and to determine the position of the head relative to one or more reference points (e.g., fixed markers within the vehicle interior). The optical sensor 40 may then output a signal indicative of the occupant head position. In addition, the sensor assembly 38 may include one or more capacitive sensors 42 configured to monitor the position of the occupant head based on proximity of the head to the one or more sensors. As will be appreciated, capacitive sensors 42 are configured to generate an electrical field, and to detect an object proximate to the sensor based on a disruption to the field. In certain embodiments, an array of capacitive sensors may be positioned throughout the vehicle interior 12, and the occupant head position may be determined by monitoring the disruption of each respective electric field. The capacitive sensor 42 may then output a signal indicative of the position of the occupant head.

As illustrated, the vehicle display assembly 28 also includes a controller 46 communicatively coupled to the sensor assembly 38 and to the actuator 32. The controller is configured to instruct the actuator 32 to adjust the orientation of the 3D display 30 based on the position of the head of the vehicle occupant. For example, the controller 46 may be configured to instruct the actuator 32 to direct the 3D display 30 toward the head of the vehicle occupant. Accordingly, the 3D display 30 may be oriented substantially perpendicular to a line-of-sight of the vehicle occupant while the head of the vehicle occupant is directed toward the 3D display 30. As a result, vehicle occupants may be able to view an image on the display in three dimensions despite variations in lateral seating position and/or movement (e.g., in the lateral direction) in response to vehicle dynamics.

By way of example, upon activation of the vehicle 10, the sensor assembly 38 detects the position of the head of the driver (e.g., via the optical sensor 40 and/or the capacitive sensor 42). The controller 46 then instructs the actuator 32 (e.g., the servo motor 34 and/or the electroactive polymer 36) to direct the 3D display 30 toward the head of the driver. As a result, the 3D display 30 is oriented substantially perpendicular to the line-of-sight of the driver, thereby enabling the driver to view images on the 3D display 30 in three dimensions. If the head of the driver moves to the right (e.g., in response to a turn), the vehicle display assembly 28 automatically adjusts the orientation of the 3D display 30 to compensate for the new driver head position. For example, if the sensor assembly 38 detects movement of the head to the right, the controller 46 may instruct the actuator 32 to direct the 3D display 30 toward the new head position. As a result, the driver may continue to view images on the display in three-dimensions.

Figure 4:
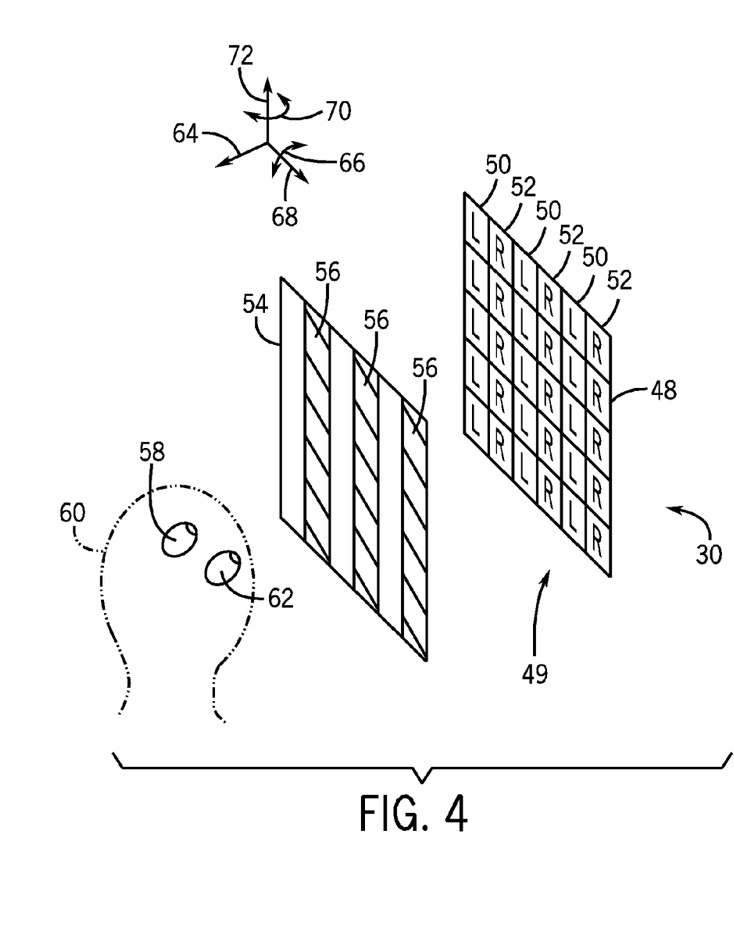
FIG. 4 is a perspective view of an embodiment of a three-dimensional display having a parallax barrier.

FIG. 4 is a perspective view of an embodiment of a 3D display 30 having a parallax barrier. In the illustrated embodiment, the 3D display 30 includes an array of pixels 48 configured to form an image on a display surface 49. As illustrated, the array of pixels 48 is divided into alternating columns of left-eye pixels 50 and right-eye pixels 52. As discussed in detail below, the left-eye pixels 50 are configured to form a left-eye portion of a 3D image, and the right-eye pixels 52 are configured to form a right-eye portion of the 3D image. A parallax barrier 54 is positioned adjacent to the display surface 49 to separate the image into the left-eye portion and the right-eye portion. In the illustrated embodiment, the parallax barrier 54 is fixed (e.g., non-movable) relative to the display surface 49. As illustrated, the parallax barrier 54 includes substantially opaque regions 56. The substantially opaque regions 56 are configured to block the right-eye portion of the image from a left eye 58 of the vehicle occupant 60. Similarly, the substantially opaque regions 56 are configured to block the left-eye portion of the image from a right eye 62 of the vehicle occupant 60. Accordingly, while the 3D display 30 is directed toward the head of the vehicle occupant 60, the left eye 58 sees the left-eye portion of the image, and the right eye 62 sees the right-eye portion of the image, thereby enabling the occupant to view the image in three-dimensions. While the illustrated 3D display includes a parallax barrier, it should be appreciated that alternative 3D displays may include other suitable devices for separating the image into a left-eye portion and a right-eye portion (e.g., a lenticular array).

In the illustrated embodiment, the vehicle display assembly 28 is configured to adjust an orientation of the 3D display 30 based on the position of the head of the occupant 60. For example, an axis 64 perpendicular to a surface of the display may be directed toward the occupant head. As a result, the left-eye portion of the image is directed toward the left eye 58, and the right-eye portion of the image is directed toward the right eye 62. If a vertical position of the occupant head varies during operation of the vehicle (e.g., due to vehicle dynamics), the vehicle display assembly may rotate the display 30 in a direction 66 about a horizontal axis 68. In addition, if a lateral position of the occupant head varies during operation of the vehicle, the vehicle display assembly may rotate the display 30 in a direction 70 about a vertical axis 72. In the manner, the 3D display 30 may be directed toward the head of the vehicle occupant 60 despite movement of the occupant during operation of the vehicle.

In certain embodiments, the 3D display 30 may include a wide viewing angle in the vertical direction. Accordingly, an occupant may be able to view 3D images on the display 30 despite significant angular variations between the occupant head and the display (at least in the direction 66). In such embodiments, the actuator configured to rotate the display 30 in the direction 66 about the horizontal axis 68 may be obviated. Therefore, a single actuator 32 may be employed to rotate the 3D display 30 in the direction 70 about the vertical axis 72 in response to lateral movement of the occupant head.

Figure 5:
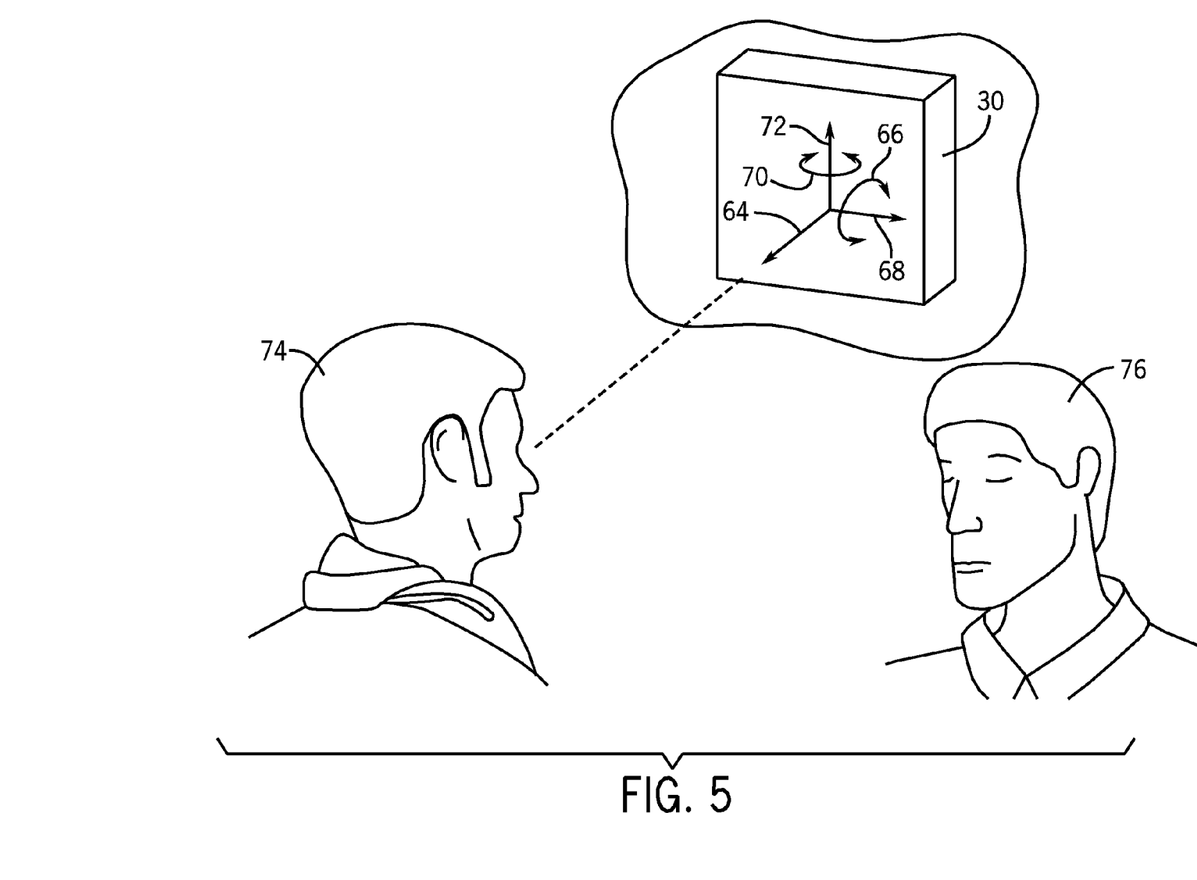
FIG. 5 is a perspective view of an embodiment of a vehicle display assembly configured to direct a three-dimensional display toward a driver or a passenger.

FIG. 5 is a perspective view of an embodiment of a vehicle display assembly configured to direct a 3D display toward a driver or a passenger. In certain embodiments, the sensor assembly is configured to monitor a first orientation of a first head 74 (e.g., driver head) and a second orientation of a second head 76 (e.g., passenger head). In such embodiments, the controller is configured to instruct the actuator to direct the 3D display toward the first head 74 while the first head is directed toward the 3D display, and to instruct the actuator to direct the 3D display toward the second head 76 while the second head 76 is directed toward the 3D display. If both heads 74 and 76 are directed toward the display 30 at the same time, the controller may direct the display toward the driver (e.g., based on a predetermined priority).

As illustrated, the first head 74 is directed toward the display, and the second head 76 is directed away from the display. Accordingly, the vehicle display assembly directs the 3D display 30 toward the first head 74 (e.g., via rotation of the display in the direction 70 about the vertical axis 72). Because the display is directed toward the head of the first occupant, the first occupant may view images on the display in three dimensions. If the first occupant orients the first head 74 away from the display and the second occupant orients the second head 76 toward the display, the vehicle display assembly may rotate the display in the direction 70 toward the second head 76, thereby enabling the second occupant to view images on the display in three dimensions. In addition, if the first head 74 is positioned at a different height than the second head 76, the vehicle display assembly may rotate the display in the direction 66 about the horizontal axis 68 to direct the display toward the second head 76.

Figure 6:
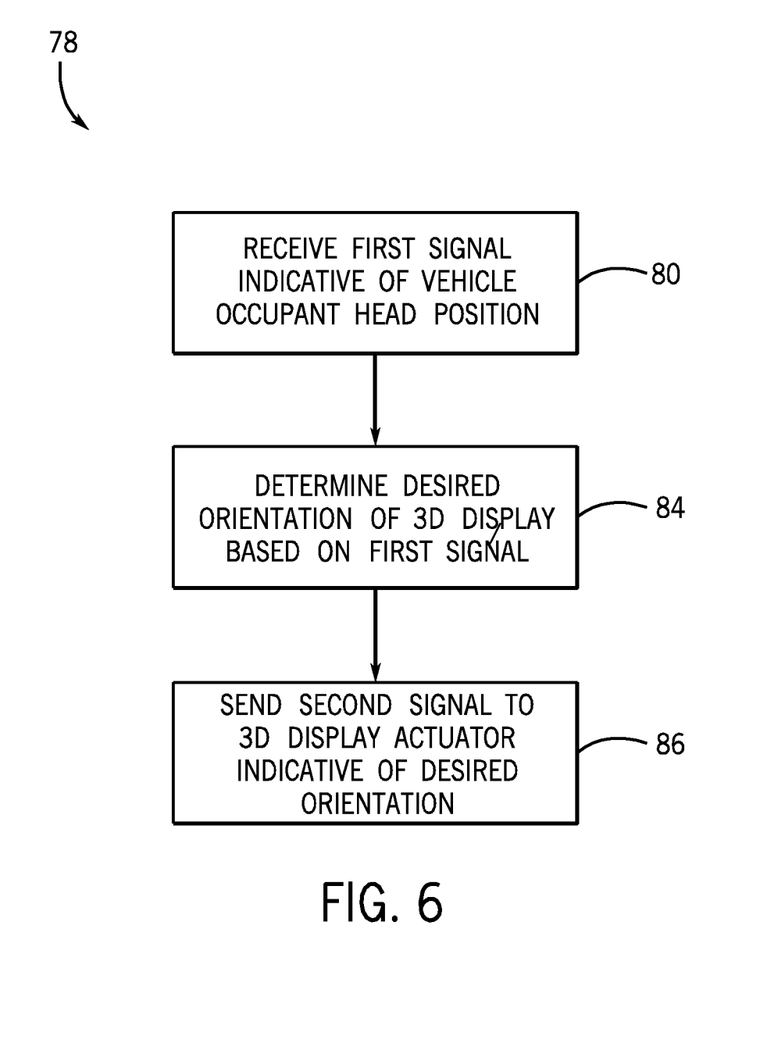
FIG. 6 is a flow diagram of an embodiment of a method of operating a vehicle display assembly.

FIG. 6 is a flow diagram of an embodiment of a method 78 of operating a vehicle display assembly. First, as represented by block 80, a first signal indicative of a position of a head of a vehicle occupant is received. The signal may be received from the sensor assembly 38 (e.g., from the optical sensor 40 and/or the capacitive sensor 42). A desired orientation of the 3D display is then determined based on the first signal, as represented by block 84. In certain embodiments, the desired orientation directs the 3D display toward the head of the vehicle occupant. Next, as represented by block 86, a second signal indicative of the desired orientation is sent to an actuator coupled to the 3D display (e.g., the servo motor 34 and/or the electroactive polymer 36). As a result, the 3D display may be directed toward the head of the vehicle occupant during operation of the vehicle, thereby enabling the vehicle occupant to view images on the display in three-dimensions.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle display assembly, comprising:
an autostereoscopic display;
an actuator coupled to the autostereoscopic display, wherein the actuator is configured to adjust an orientation of the autostereoscopic display relative to a first vehicle occupant and a second vehicle occupant;
a sensor assembly configured to monitor a first position of a first head of the first vehicle occupant, and a second position of a second head of the second vehicle occupant; and
a controller communicatively coupled to the sensor assembly and to the actuator, wherein the controller is configured to instruct the actuator to adjust the orientation of the autostereoscopic display based selectively on the first position of the first head and the second position of the second head;
wherein the sensor assembly is configured to monitor a first orientation of the first head and a second orientation of the second head, the controller is configured to instruct the actuator to direct the autostereoscopic display toward the first head while the first head is directed toward the autostereoscopic display and the second head is not directed toward the autostereoscopic display, the controller is configured to instruct the actuator to direct the autostereoscopic display toward the second head while the second head is directed toward the autostereoscopic display and the first head is not directed toward the autostereoscopic display, and the controller is configured to instruct the actuator to direct the autostereoscopic display toward the first head while the first and second heads are directed toward the autostereoscopic display based on a priority.

2. The vehicle display assembly of claim 1, wherein the autostereoscopic display comprises a plurality of pixels configured to form an image on a display surface, and a parallax barrier positioned adjacent to the display surface to separate the image into a left-eye portion and a right-eye portion, wherein the parallax barrier is fixed relative to the display surface.

3. The vehicle display assembly of claim 2, wherein the controller is configured to instruct the actuator to adjust the orientation of the autostereoscopic display to direct the left-eye portion of the image toward a left eye of a respective vehicle occupant, and to direct the right-eye portion of the image toward a right eye of the respective vehicle occupant.

4. The vehicle display assembly of claim 1, wherein the actuator comprises an electrical servo motor.

5. The vehicle display assembly of claim 1, wherein the sensor assembly comprises an optical sensor.

6. The vehicle display assembly of claim 1, wherein the actuator comprises an electroactive polymer.

7. The vehicle display assembly of claim 1, wherein the actuator comprises a linear actuator.

8. The vehicle display assembly of claim 1, wherein the sensor assembly comprises a capacitive sensor.

9. The vehicle display assembly of claim 1, wherein the first vehicle occupant is a driver, and the second vehicle occupant is a passenger.

10. A vehicle display assembly, comprising:
an autostereoscopic display;
an actuator coupled to the autostereoscopic display, wherein the actuator is configured to rotate the autostereoscopic display about a horizontal axis and about a vertical axis relative to a first vehicle occupant and a second vehicle occupant;
a sensor assembly configured to monitor a first position of a first head of the first vehicle occupant, and a second position of a second head of the second vehicle occupant; and
a controller communicatively coupled to the sensor assembly and to the actuator, wherein the controller is configured to instruct the actuator to rotate the autostereoscopic display about the horizontal axis, about the vertical axis, or a combination thereof, based selectively on the first position of the first head and the second position of the second head;
wherein the sensor assembly is configured to monitor a first orientation of the first head and a second orientation of the second head, the controller is configured to instruct the actuator to direct the autostereoscopic display toward the first head while the first head is directed toward the autostereoscopic display and the second head is not directed toward the autostereoscopic display, the controller is configured to instruct the actuator to direct the autostereoscopic display toward the second head while the second head is directed toward the autostereoscopic display and the first head is not directed toward the autostereoscopic display, and the controller is configured to instruct the actuator to direct the autostereoscopic display toward the first head while the first and second heads are directed toward the autostereoscopic display based on a priority.

11. The vehicle display assembly of claim 10, wherein the autostereoscopic display comprises a plurality of pixels configured to form an image on a display surface, and a parallax barrier positioned adjacent to the display surface to separate the image into a left-eye portion and a right-eye portion, wherein the parallax barrier is fixed relative to the display surface.

12. The vehicle display assembly of claim 11, wherein the controller is configured to instruct the actuator to rotate the autostereoscopic display about the horizontal axis, about the vertical axis, or a combination thereof, to direct the left-eye portion of the image toward a left eye of a respective vehicle occupant, and to direct the right-eye portion of the image toward a right eye of the respective vehicle occupant.

13. The vehicle display assembly of claim 10, wherein the actuator comprises an electrical servo motor.

14. The vehicle display assembly of claim 10, wherein the sensor assembly comprises an optical sensor.

15. The vehicle display assembly of claim 10, wherein the actuator comprises an electroactive polymer.

16. The vehicle display assembly of claim 10, wherein the actuator comprises a linear actuator.

17. The vehicle display assembly of claim 1, wherein the sensor assembly comprises a capacitive sensor.

18. The vehicle display assembly of claim 10, wherein the first vehicle occupant is a driver, and the second vehicle occupant is a passenger.

* * * * *